United States Patent [19]

Hesse et al.

[11] Patent Number: 5,089,589
[45] Date of Patent: Feb. 18, 1992

[54] PROCESS FOR THE PREPARATION OF NOVOLAKS AND THEIR USE

[75] Inventors: Wolfgang Hesse, Taunusstein; Klaus Hofmann, Ingelheim; Erhard Leicht, Hofheim am Taunus, all of Fed. Rep. of Germany

[73] Assignee: Hoechst Aktiengesellschaft, Frankfurt, Fed. Rep. of Germany

[21] Appl. No.: 467,851

[22] Filed: Jan. 22, 1990

[30] Foreign Application Priority Data

Jan. 24, 1989 [DE] Fed. Rep. of Germany ....... 3901930

[51] Int. Cl.$^5$ .................. C08G 8/04; C08G 14/02; C08G 8/20; C08F 6/00
[52] U.S. Cl. .................................. 528/129; 526/70; 528/125; 528/143; 528/155; 528/156; 528/159; 528/165; 528/497; 528/498
[58] Field of Search ............... 528/143, 155, 156, 165, 528/129, 159, 497, 498, 125; 526/70

[56] References Cited

U.S. PATENT DOCUMENTS

| | | | |
|---|---|---|---|
| 2,411,557 | 2/1943 | Schuk | 528/129 |
| 3,083,170 | 3/1963 | Booty | 528/129 |
| 4,025,479 | 5/1977 | Jung et al. | 528/159 |
| 4,073,826 | 2/1978 | Galkiewicz et al. | 528/129 |
| 4,097,463 | 6/1978 | Culbertson | 528/129 |
| 4,812,551 | 3/1989 | Oi et al. | 528/129 |

Primary Examiner—Harold D. Anderson
Assistant Examiner—T. Mosley
Attorney, Agent, or Firm—Bierman and Muserlian

[57] ABSTRACT

The preparation of novolaks from phenols or mixtures of different phenols, and oxo compounds or mixtures of oxo compounds by condensation of the reactants in a medium having a low water content in homogeneous phase at temperature of $\geq 110°$ C., preferably between 115° and 200° C. and preferably at normal pressure, in the presence of water-immiscible and/or only partially water-miscible inert organic solvents and of acids as catalysts with removal of water by distillation, the medium having a low water content being prepared or maintained by distilling off water from the reaction mixture, preferably by azeotropic distillation. Particular advantages are obtained when readily volatile oxo compounds, in particular aqueous formaldehyde solutions, are used.

Use of the novolaks as reinforcing resins for rubber and elastomers, as tackifiers for rubber, as binders for friction linings, as curable molding compositions, impregnating agents, coatings, paints and as binders for fine-particle inorganic substrates.

8 Claims, No Drawings

PROCESS FOR THE PREPARATION OF NOVOLAKS AND THEIR USE

The invention relates to a process for the preparation of novolaks from phenols, or mixtures of different phenols, and oxo compounds or mixtures of oxo compounds, where particular advantages are obtained from the use of readily volatile oxo compounds, in particular aqueous solutions of formaldehyde. The novolaks are obtained by acid catalyzed condensation of the reactants in homogeneous phase at temperatures $\geq 110°$ C. in a medium with a low water content.

It is known that phenols react with oxo compounds in the presence of catalysts, as a rule in the presence of acids, to form novolaks. Except in specific cases, formaldehyde is used in the form of 30 to 50% by weight strength aqueous solutions. In principle, it is also possible to use low-water solutions of formaldehyde in phenols it being possible for example to prepare such solutions by dissolving gaseous formaldehyde, or depolymerizing paraformaldehyde, in phenols. This method has the disadvantage however that the highly exothermic condensation reaction cannot be controlled with the necessary safety and that water of condensation remains in the reaction mixture.

Novolak condensation produces a considerable amount of exothermic heat, for example 98 kJ/mole of formaldehyde. This heat of reaction must be absorbed or led off by cooling in order that the process may be carried out safely. Safe reaction management dictates that the formaldehyde be added not all at once but spread over a relatively long period. Even then, a build-up of surplus energy can occur and the reactor can become critical.

Novolak condensation is carried out by known methods and only initially in homogeneous phase. With a gradually increasing degree of condensation the reaction medium separates into an organic resin phase and an aqueous phase. If, at the moment of separation, the phases are in a superheated state, dangerous retardation of boiling can occur. Both factors, build-up of surplus energy and superheating of the phases, often take effect jointly in the same dangerous direction. Vessels may become bulged or may even explode. Safety therefore requires that the reaction is carried out much more slowly than would be possible from the reaction kinetics. When the condensation reaction is carried out in the customary manner under atmospheric pressure, the reaction temperature must therefore not exceed the boiling point of water, i.e. 100° C., but rather must be a few degrees below this.

In practice, this represents a considerable waste of time and a considerably reduced time yield. The use of aqueous formaldehyde solution and the resulting water of condensation also reduces the space yield. Using phenol, it is normally 40 to 45%.

The catalysts used for the reaction are acids. Although the method, as described, basically permits low cost strong mineral acids such as sulfuric acid, hydrochloric acid and so on to be used, these acids, in the strongly aqueous reaction medium, can cause pronounced corrosion of the reactor material, so that in practice high cost organic acids such as for example oxalic acid, trichloroacetic acid and so on are used and this in relatively large proportions of about 1% by weight relative to the phenolic component. The two organic acid catalysts mentioned will later decompose under the conditions used for working up the reaction mixture, so that they do not form part of the resin yield. Furthermore, toxic substances can be produced when they decompose.

If the phenol component used for novolak formation by known methods is a phenol which is trifunctional toward oxo compounds, for example phenol itself, the phenol component must be used in excess. The magnitude of this excess also determines the degree of condensation. When the unconverted phenol components are distilled off, a mixture of phenols with water results which separates into two phases, a phenolic and an aqueous phase. The aqueous phase, which is to be discharged as wastewater, contains, depending on the temperature of separation, 6 to 8% by weight of free phenol. This wastewater must be disposed of for example by burning or in a biological wastewater treatment station. Both methods are very expensive and the costs of biological treatment are furthermore governed by the phenol content of the wastewater. The phenolic phase of the distillate contains about 20% by weight of water and is usually reused. In this case, either the water content must be taken into account and a further dilution of the reactants tolerated in the next batch, or else the water must be removed beforehand by distillation.

The condensation reaction between the phenolic component and oxo compounds results initially in phenols with methylol groups or with substituted methylol groups. These can condense further with phenols to form alkylidene bridges and are relatively unstable in the acid medium. The complete conversion of these reactive groups into alkylidene bridges is a time-dependent reaction which does not proceed to completion under the normal reaction conditions at 100° C. If, however, after more or less complete consumption of the oxo compounds, the resin is distilled in order to release the unconverted phenols, the remaining reactive methylol groups are converted into alkylidene bridges by the effect of the rising temperature. However, the distillation process alters the molar ratio between the oxo compound and the phenol, the ratio which determines the degree of condensation. Uncertainty concerning the reproducibility of the batch is therefore introduced. These inconsistencies are even more pronounced if instead of relatively rapidly reacting phenols, such as for example phenol itself, more slowly reacting phenols, in particular for example alkyl phenols, are used. If the phenolic component used is not an individual compound but a mixture of different phenols which react with oxo compounds at different rates, the composition of the end product after working up differs significantly from the composition of the starting mixture. In the extreme case, mixtures of homocondensates will then be present. In any case, true mixed condensates only occur within a narrow range of reaction rate. Novolaks of this type are often very cloudy and additionally contain large amounts of the more slowly reacting and hence even more incompletely converted phenol. Since the more slowly reacting phenols, for example alkylphenols, have a significantly higher boiling point than the simple, unsubstituted phenol, their removal from the end product is possible, if at all, only at very great expense such as for example vacuum-steam distillation, distillation under extremely high vacuum or extraction.

As explained above, novolak condensation results in rapid phase separation of the reaction mixture. Reactants and catalysts are present in the various phases at different concentrations. This fact further accentuates the already disadvantageous conditions resulting from the different reaction rates of the phenols. The object of the present invention was therefore to provide an advantageous process by overcoming the above difficulties and disadvantages.

Surprisingly it has now been found that these disadvantages which affect not only the feasibility of the process but also the quality of the end product can be avoided if a process for the preparation of novolaks from one or more phenols and one or more oxo compounds with condensation of the reactants is carried out in such a way that the reactants are condensed in homogeneous phase in a medium having a low water content, preferably under normal pressure, at temperatures $\geq 110°$ C. in the presence of strong acids as a catalyst and in the presence of water-immiscible and/or only partially water-miscible inert organic solvents which are preferably distillable and in particular can form an azeotrope with water, and the medium having a low water content is established by distillation.

The invention therefore relates to a process for the preparation of novolaks from a phenol or a plurality of phenols and an oxo compound or a plurality of oxo compounds by condensation of the reactants in a water-containing medium, which comprises condensing the reactants, preferably under normal pressure, in a medium having a low water content in homogeneous phase at temperatures of $\geq 110°$ C., preferably between 115° and 200° C., in particular between 120° and 160° C., in the presence of water-immiscible and/or only partially water-miscible inert organic solvents and of acids as a catalyst, with removal of water by distillation, and establishing or maintaining the medium having a low water content by distilling off water from the reaction mixture, preferably as an axeotrope with the organic solvent.

The simultaneous distillation of water during the condensation of the novolak is advantageously and preferably carried out as an azeotropic distillation with the solvent being fed back, preferably in a cycle. This azeotropically distilling solvent is also designated below as an entrainer and the type of distillation also as recycle-distillation. The water-immiscible entrainers used are preferably aromatics, such as for example toluene, xylene or diethylbenzene and the only partially water-miscible entrainers used are preferably the only partially water-miscible alcohols such as for example butanol. Furthermore, the reaction mixture may also contain high-boiling organic solvents which may be water-miscible such as for example dimethyl (triethylene glycol) ether, ethylene glycol monobutyl ether or polyethylene glycol ether or water-immiscible such as for example di-n-butyl (tripropylene glycol) ether.

The process is carried out in a reactor, for example a customary vessel or glass flask which is equipped with a stirrer, heater, thermostat, feeding device, reflux condenser and water separator. The phenol or the phenols are initially introduced with the catalyst and the entrainer and brought to the desired reaction temperature or distillation temperature, and the oxo compound, preferably for example aqueous formaldehyde solution, is added over a period of a few hours. It is also possible to initially introduce only a part of the phenols and to add the rest along with the oxo compound and the reaction temperature. Immediately after adding the oxo compound, elimination of water begins and continues during the entire addition and for a few minutes after the end of the addition. Not only does the reaction proceed very rapidly and can readily be controlled but distillation of the water proceeds simultaneously, an operation which in the case of conventional processes is carried out, if desired, after the condensation reaction, this requiring an additional amount of time.

Working up of the reaction solution is carried out according to the invention by distillation. After the water of reaction and the water which has been additionally used to dissolve the oxo compound have already been removed under the reaction conditions, the remaining solution of novolak, unconverted phenol and entrainer is worked up by vacuum distillation, the distillation conditions determining the residual content of phenol.

Since the water has already been distilled off during the reaction, working up only requires distilling off the entrainer and any unconverted phenols. This considerably shortens the duration of the process.

The process according to the invention for the preparation of novolaks can also advantageously be carried out continuously by introducing the reactants to the fully reacted, but not yet worked up reaction mixture, in the required mixing ratio, i.e. phenols and oxo compounds as a mixture with entrainer and catalyst, at the reaction temperature according to the invention and with continued recycle-distillation and continuously withdrawing the freshly prepared reaction product and working it up, working up if desired being continous.

While in existing processes, the heat of reaction of novolak formation must be led off or eliminated by cooling, in the process according to the invention the heat of reaction is used for evaporating the water which has been introduced or the water of condensation which forms. Even if part of the heat of reaction is consumed for evaporating the entrainer used for the recycle-distillation, a positive and advantageous energy balance is still produced.

In contrast with known processes, the water introduced into the process according to the invention and the water which results in the course of the process are continuously led off and the condensation reaction takes place in a homogeneous phase. This eliminates for example one of the reasons for the build-up of surplus energy. Furthermore, and this is particularly important when different phenols are used, uniform reaction conditions are established for all reactants. The presence of a homogeneous or uniform phase whose mobility is additionally increased due to higher temperatures and the presence of solvent facilitates the reaction and makes it possible for the first time to carry out the condensation reaction by a continuous method and to carry out the cocondensation of for example phenol and alkylphenols to form cocodensates.

The reaction conditions of the process according to the invention comprise in particular high reaction temperatures with operation under atmospheric pressure, immediate removal of the water of condensation by distillation from the equilibrium, and particularly high effectiveness of the catalyst used. The time for subsequent reaction is consequently very short and is generally only fractions of minutes. A further significant cause of the build-up of surplus energy is therefore eliminated. Catalysts used are preferably strong mineral acids and/or their acid derivatives, in particular sulfuric acid or its acid derivatives. The catalyst can be neutralized before working up of the reaction mixture, preferably with basic metal hydroxides or amines. In the case of sulfuric acid or its acid derivatives, the catalyst can also be split off reductively by the addition of terpenes and removed from the reaction product in the form of $SO_2$. According to the invention, the condensation reaction proceeds virtually quantitatively and with the immediate formation of alkylidene bridges. It can be shown that under the reaction conditions according to the invention the reaction rates of different phenols are so similar that the preparation of true co-condensates can be brought about without difficulty.

The simultaneous removal of the water which has been introduced and of the water of reaction from the reaction mixture enables the space yield to be greatly increased. It increases from 40–45% with known processes to 70–80% according to the invention. The process according to the invention therefore not only improves the time yield but also the space yield.

Carrying out the process according to the invention enables strong acids to be used as the catalyst without fear of corrosion of the reactor material, while such acids when similarly used in a reaction medium with an aqueous phase would vigorously attack the reactor material or damage it. These strong acids, such as for example sulfuric acid, are very effective catalysts and need only be added in very low concentration, for example in amounts of about 0.1% by weight, relative to the phenol used. A further improvement in the economy of the process is consequently obtained. Besides the catalysts for the condensation reaction, it is also possible to add, during the process, other conventional substances which influence the performance characteristics of the end products.

If volatile, in particular steam-volatile, phenols or mixtures thereof are used, in particular for example phenol (monohydroxybenzene) itself, then, according to the invention, wastewater is obtained which surprisingly contains only 1 to 2% by weight of phenol. On the other hand, the organic phase further obtained by distillation or vacuum distillation composed of a mixture of entrainer and phenol has a low water content and can be reused without further treatment as a starting material for the next batch. The organic phase has a low content of unconverted oxo compounds. This is in the range of from 0.05 to 0.15% by weight, relative to the organic phase produced.

The reaction between the phenols or mixtures thereof and oxo compounds takes place rapidly and immediately according to the invention.

Under the reaction conditions which are to be maintained, methylol groups or similar substituted groups or other reactive groups are furthermore substantially unstable and immediately react to form the desired methylene bridges. During the course of the process, no significant alteration of the initial molecular ratio of the components therefore occurs, this resulting in a greatly improved reproducibility of the product.

Suitable oxo compounds are in principle all compounds containing aldehyde and/or keto groups or producing those groups which can be reactive towards phenols which have reactive hydrogen atoms at the aromatic ring, and can form condensation products with these phenols. Among oxo compounds which can be used as starting components either individually or plurally one after the other or as a mixture, preference is given to aldehydes such as formaldehyde, acetaldehyde and their homologues or isomers having up to 18 carbon atoms per molecule, in particular up to 12 carbon atoms per molecule. Particular preference is given to the use of aqueous formaldehyde solutions. It is also possible to use ketones with up to 18, preferably up to 12 carbon atoms. Preference is given for example to acetone, methyl ethyl ketone, diethyl ketone and camphor.

Suitable phenolic components are in principle all phenolic compounds which have at least 1 reactive hydrogen atom at the aromatic nucleus and are at least monofunctional in their reactivity with aldehydes. These include for example mononuclear or polynuclear phenolic compounds whose reactivity with for example formaldehyde can be monofunctional, difunctional, trifunctional or even a higher functionality. The phenolic compounds given below can for example be used singly, plurally in succession or as a mixture. Preference is given to the use of phenol itself (monohydroxybenzene), the various cresol isomers and xylenol isomers, the isomers of ethylphenol, of propylphenol and isopropylphenol and p- or o-substituted alkylphenols having up to 18, in particular up to 15 carbon atoms in the side chain. It is also possible to use unsaturated phenols such as for example o- or p-vinylphenol, p-isopropenylphenol and the $C_{15}$-unsaturated alkenylphenols obtainable by distilling cashew nut oil. The process can also be carried out using condensed phenols, such as for example a- or b-naphthol. Furthermore, the reaction can be carried out with polynuclear phenols, such as for example the isomers of diphenylolmethane, diphenylolethane, diphenylolpropane (bisphenol A), triphenylolmethane or triphenylolethane. It is also advantageous to use polyhydric phenols, such as for example resorcinol, catechol, hydroquinone and pyrogallol as reactants.

While with the known processes it is not possible or not completely possible to carry out direct co-condensation between differently substituted phenols and unsubstituted phenol, in the process according to the invention the reaction rates with respect to oxo compounds are so similar that the composition of the phenols used and the phenols which remain unconverted after the end of the reaction is essentially the same. It is even possible according to the invention, by controlling the reaction in a particular way, to restrict the content of those phenols which react more slowly in known processes in the end product to far below the value which would be possible even given equality of the reaction rates.

In their composition the co-condensates which can be obtained by the single step process according to the invention are substantially similar to the products which can be obtained according to the prior art hitherto only by multi-step processes such as for example in accordance with DE-C-2,235,051. It is well-known that with this process of the prior art, in order to circumvent the dissimilar reaction rates of phenol and p-tert-butylphenol, the p-tert-butylphenol is initially converted into the dimethylol compound and this is then condensed together with phenol and additional formaldehyde to form the novolak.

The use of the novolaks prepared by the process according to the invention is essentially similar to that of novolaks prepared by conventional processes. It is however possible due to the multifarious adaptability of the process according to the invention to vary the properties of the novolaks in many ways and to adapt them still better to the particular requirements. In particular, the process according to the invention makes it possible to prepare novolaks which have hitherto been prepared by known processes more simply, more safely and with consistent quality at very good reproducibility. By virtue of the lower viscosity of the reaction medium, a consequence of the process, it is furthermore possible to obtain novolaks with higher molecular weights than by known processes.

The novolaks which can be obtained according to the invention can be used for example as reinforcing resins for rubber and elastomers. For this purpose, they can be incorporated, optionally after a preliminary reaction, in the still unvulcanized rubber or elastomer mixture either together with or separate from crosslinking agents such as for example hexamethylenetetramine and/or aminoplastics and/or resols.

Examples of types of rubber which are suitable for the preparation of reinforced rubber are natural rubber, styrene-butadiene rubber, polybutadiene, polyisoprene, transpolyoctenylene-butyl rubber, ethylene-propylene diene terpolymer rubber or mixtures thereof such as are commonly used in the tire industry or for the preparation of industrial rubber goods. Preference is given to styrene-butadiene and natural rubber or mixtures of these types of rubber with minor amounts of other types of rubber. They can be used in any desired supplied form, for example as bales or powders and also for example with carbon black. Furthermore, polar rubbers are also suitable such as for example nitrile rubber (copolymers of acrylonitrile with butadiene or isoprene) or polyurethane rubber. Other customary additives in the rubber composition are for example fillers, vulcanizing agents, accelerators, activators and processing auxiliaries.

The vulcanizates obtainable using the novolaks prepared according to the invention can for example be used as industrial rubber goods, such as damping elements, rubber sleeves, bellows, conveyor belts and also for vehicle tires. It is also possible here to use the rubber compositions containing the novolak in layers which must have good adhesion to incorporated fabrics or meshes. The adhesion can be improved by the additional use of coupling agents such as cobalt compounds or other metal compounds and/or a combination of these with silica, resorcinol and curing agents.

Novolaks which are obtainable according to the invention can also be used as tackifiers for rubber, in particular for synthetic rubber. When rubber articles composed of several layers are prepared, as is particularly necessary in the production of car tires, the customary unvulcanized components often do not have the tack necessary for assembly. This is particularly the case if the rubber composition is predominantly or exclusively composed of synthetic rubber. Addition of novolaks can bring about an adequate increase in the tack.

It is possible but not essential to use curing agents in this application of novolaks.

Novolaks obtainable according to the invention can furthermore also be used in the field of friction linings, of impregnating agents for organic and/or inorganic fibers, of binders for organic and/or inorganic fibers, of coatings, finishes and paints and also of binders for comminuted, preferably inorganic, materials. In these applications, the novolaks can be processed with or without crosslinking agents and also with fillers, additives, pigments and other added substances and then subjected optionally to one or more subsequent heat treatment processes, optionally with shaping, it also being possible for the temperature to be above the decomposition temperature of the novolak.

The invention is described in more detail by means of the following examples:

EXAMPLE 1

Preparation of a nonylphenol-formaldehyde novolak

The reactor used for the condensation reaction and working up of the reaction mixture consists of a 2 l fournecked glass flask provided with thermostatically controlled heating, stirrer apparatus, thermometer, feed apparatus and reflux condenser with a water separator. The water separator has a siphon of adjustable height which enables water to be continuously separated off.

660 g of nonylphenol, 120 g of xylene and 28.4 ml of 0.5N sulfuric acid are added to the reactor and the water separator is filled with xylene. The mixture is heated below the reflux condenser to a temperature of 150° C. During this operation, water introduced due to the catalyst separates off. 243 g of a 37% by weight strength aqueous formaldehyde solution is now steadily run in the course of 3 hours at 150° C. Separation of water commences immediately after the formaldehyde begins to be metered in. The water separation ends 1 minute after the formaldehyde has ceased to be admitted.

14.2 ml of 0.5N sodium hydroxide are then added to the reaction mixture and the water introduced with the sodium hydroxide is removed by recycle-distillation. A total of 249 g of aqueous phase with a formaldehyde content of 0.15% by weight and a xylene content of 0.2% by weight, relative to the aqueous phase, are produced. The novolak solution obtained is then worked up in the following manner, which is also relevant to the other examples: The reflux condenser and water separator are replaced by a descending condenser with receiver. The volatile components are then distilled off, initially under normal pressure up to 210° C. and then under a vacuum of 60 mbar for 1 hour at 210° C.

115 g of recovered xylene are obtained. In the reactor flask, there remain 697 g of a nonylphenol novolak with a melting point (m.p.) of 96° C. and a viscosity of 71 mPa.s/measured at 20° C. (1:1 in xylene).

COMPARATIVE EXAMPLE 1

Preparation of a nonylphenol-formaldehyde novolak

For this comparative example, not according to the invention, a 2 l four-necked glass flask is used as the reactor, and is fitted with thermostatically controlled heating, cooling apparatus, thermometer, stirrer, feed apparatus and reflux condenser without water separator.

660 g of nonylphenol and 13.2 g of oxalic acid dihydrate are added to the glass flask, the mixture is brought to 100° C. and 243 g of an aqueous 37% by weight strength formaldehyde solution are added over a period of 1 h. Cooling is initially necessary. After stirring for 12 hours at 100° C., the content of free formaldehyde falls to 1.2% by weight. After stirring for a further 2 hours, the formaldehyde content remains at this value.

The reaction mixture is worked up as described in Example 1.

Working up by distillation produces 198 g of an aqueous phase having a residual formaldehyde content of 2.2% by weight.

In the reactor flask, there remain 681 g of a nonylphenol novolak with a melting point (m.p.) of 58° C. and a viscosity of 15 mPa.s/measured at 20° C. (1:1 in xylene).

EXAMPLE 2

Preparation of a phenol-formaldehyde novolak 940 g of phenol, 40 g of xylene and 40 ml of 0.5N sulfuric acid are initially introduced into the reactor described in Example 1 and the water separator is filled with 86 g of xylene. The mixture is heated with stirring to 125° C. and at this temperature 616 g of an aqueous 37% by weight strength formaldehyde solution is added uniformly dropwise over a period of 3 hours. 5 min. after admission of the formaldehyde solution has ceased, 20 ml of 0.5N sodium hydroxide are added and water (originating from the NaOH) is separated off up to a bottom temperature of 170° C. 607.8 g of aqueous phase are obtained, having a formaldehyde content of 0.12% by weight and a phenol content of 1.7% by weight.

The dehydrated novolak solution obtained is worked up by distillation as described in Example 1 and together with the contents of the water separator gives 209.2 g of a distillate containing 59% by weight of xylene, 39.8% by weight of phenol, 0.5% by weight of water and 0.01% by weight of formaldehyde. In the reactor flask there remain 913 g of a phenol-formaldehyde novolak which still contains 0.7% by weight of unconverted phenol. The softening point (m.p.) of the novolak is 92° C. and the viscosity is 2790 mPa.s/-measured at 20° C. (1:1 in methoxypropanol).

EXAMPLE 3

Preparation of a p-isooctylphenol-phenol-formaldehyde novolak 303 g of p-isooctylphenol, 415 g of phenol, 120 of xylene and 30.9 ml of 0.5N sulfuric acid are initially introduced into the reactor described in Example 1, the water separator is filled with xylene and the batch is brought to a temperature of 130° C. 381 g of a 37% by weight strength aqueous formaldehyde solution is then run in over a period of 3.5 hours. 10 min. after addition of the formaldehyde solution has ceased, the reaction mixture is neutralized with 15.45 ml of 0.5N sodium hydroxide and dehydrated by distillation at temperatures rising to 170° C. The reaction product contains 5.19% by weight of unconverted phenol and 4% by weight of unconverted octylphenol. After working up the reaction product by distillation as described in Example 1, there remain 728 g of a p-isooctylphenol-phenol-formaldehyde novolak containing 5% by weight of unconverted p-isooctylphenol and 0.5% by weight of unconverted phenol. The melting point (m.p.) of the novolak is 90° C. and the viscosity is 1850 mPa.s/-measured at 20° C. (1:1 in methoxypropanol).

EXAMPLE 4

Preparation of a p-isooctylphenol-phenol-formaldehyde novolak

The procedure described in Example 3 is followed and in this 515 g of p-isooctylphenol, 235 g of phenol, 324 g of an aqueous 37% by weight strength formaldehyde solution, 32.3 ml of 0.5N sulfuric acid and 16.2 ml of 0.5N sodium hydroxide are used. After dehydration by distillation at 170° C., the reaction product contains 2.87% by weight of unconverted phenol and 5.9% by weight of unconverted p-isooctylphenol.

After working up the reaction product by distillation as described in Example 1, 776 g of a p-isooctylphenol-phenol-formaldehyde novolak are obtained containing 7% by weight of unconverted p-isooctylphenol and 0.3% by weight of unconverted phenol. The melting point (m.p.) of the novolak is 82° C. and the viscosity is 639 mPa.s/measured at 20° C. (1:1 in methoxypropanol).

COMPARATIVE EXAMPLE 2

Co-condensation of p-isooctylphenol and phenol with formaldehyde

This comparative example not according to the invention is carried out in comparison with Example 3.

A mixture of 257.5 g of p-isooctylphenol, 352.5 of phenol and 12.5 g of oxalic acid dihydrate are initially introduced into the reactor described in Comparative Example 1 and the mixture is heated to 100° C. 324 g of an aqueous 37% by weight strength formaldehyde solution are added at this temperature over a period of 1 hour. During this time, the reaction mixture is kept at 100° C. by intermittent cooling and heating. Phase separation occurs 20 min. after addition of the formaldehyde solution has commenced. After addition of the formaldehyde solution has ceased, the reaction mixture is boiled under reflux for a further 7 hours at the end of which the formaldehyde content has fallen to 0.1% by weight. After vigorous stirring, a sample is withdrawn in order to determine the unconverted phenol and the unconverted p-isooctylphenol. The sample contains 6.1% by weight of unconverted p-isooctylphenol and 1.8% by weight of unconverted phenol. After working up the reaction product by distillation as described in Example 1, there remain in the reactor flask 641 g of an inherently turbid resin with a melting point (m.p.) of 71° C. and a viscosity of 750 mPa.s/measured at 20° C. (1:1 in methoxypropanol).

The resin contains 9% by weight of unconverted p-isooctylphenol and 0.3% by weight of unconverted phenol.

COMPARATIVE EXAMPLE 3

Co-condensation of p-isooctylphenol and phenol with formaldehyde

This comparative example not according to the invention is carried out in comparison with Example 4.

The procedure of Comparative Example 2 is followed, but with the following difference:

515 g of p-isooctylphenol, 235 g of phenol, 15 g of oxalic acid dihydrate and 324 g of an aqueous 37% by weight strength formaldehyde solution are used and when the addition of the formaldehyde solution has ceased, the reaction mixture is stirred under reflux for 12 hours. The reaction product then contains 0.2% by weight of free formaldehyde.

A sample taken from the reaction product at this time contains 1.65% by weight of free phenol and 10.4% by weight of free p-isooctylphenol. After working up the reaction product by distillation as described in Example 1, there remain 780 g of an inherently turbid resin with a melting point (m.p.) of 53° C. and a viscosity of 330 mPa.s/measured at 20° C. (1:1 in methoxypropanol). The resin contains 0.4% by weight of free phenol and 14.6% by weight of free p-isooctylphenol.

EXAMPLE 5

Preparation of a p-isooctylphenol-phenol-formaldehyde novolak 309 g of isooctylphenol, 120 g of xylene and 35 ml of 0.5N sulfuric acid are initially introduced into the reactor described in Example 1, the water separator is filled with xylene and the batch is brought to 140° C. Then 61 g of an aqueous 37% by weight strength formaldehyde solution is run in over a period of 30 min. When addition of the formaldehyde solution has ceased, a mixture of 529 g of phenol and 323.5 g of an aqueous 37% strength by weight solution of formaldehyde are introduced uniformly over a period of 3 hours. 5 min. after addition of this mixture has ceased, the reaction mixture is neutralized with 17.5 ml of 0.5N sodium hydroxide and worked up by distillation as described in Example 1. In the reactor flask there remain 728 g of a p-isooctylphenol-phenolformaldehyde novolak with a melting point (m.p.) of 85° C. and a viscosity of 3140 mPa.s/- measured at 20° C. (1:1 in methoxypropanol).

The novolak contains 0.5% by weight of unconverted p-isooctylphenol and 0.6% by weight of unconverted phenol.

EXAMPLE 6

Preparation of a n-butyraldehyde-phenol novolak 815 g of phenol, 167 g of toluene and 0.9 g of concentrated sulfuric acid are initially introduced into the reactor described in Example 1, the water separator is filled with toluene and 394 g of n-butyraldehyde (25% by weight strength aqueous solution) is added uniformly over a period of 6 hours at 120° C. In the water separator, 110 g of aqueous phase separates out, having a n-butyraldehyde content of 0.12% by weight and a toluene content of 0.2% by weight. 22 g of colophonium are added to the reaction mixture before working up by distillation. After working up by distillation as described in Example 1, there remain in the reactor flask 933 g of a n-butyraldehyde-phenolnovolak with a melting point (m.p.) of 60° C. and a viscosity of 280 mPa.s/measured at 20° C. (1:1 in methoxypropanol).

EXAMPLE 7

Continuous preparation of a phenol-formaldehyde novolak

The 2 l four-necked round glass flask of the reactor described in Example 1 is additionally provided with a floor drain of internal diameter 18 mm which is passed through the heating jacket and terminates in the male part of a ground glass joint. Mounted on this male ground glass joint with a female ground glass joint is a glass tube, also of 18 mm internal diameter, bent into an S-shape, which functions as a siphon. The lower, horizontal part of the siphon is rendered mobile by means of male and female ground glass components of a ball and socket joint so that the siphon can be used by tilting sideways to regulate the level of the contents of the glass reactor flask. The total length of the floor drain and siphon is 42 cm. The siphon is surrounded by a heating jacket.

A dehydrated and not yet worked up novolak solution which has been prepared according to Example 2 from 940 g of phenol, 150 g of xylene and 583 g of an aqueous 37% strength by weight formaldehyde solution in the presence of 50 ml of 0.5N sulfuric acid and has a temperature of 140° C. is initially introduced into the reactor.

Before introducing the novolak solution, the siphon is temperature controlled to 140° C. via a thermostat pump. The novolak solution which has been introduced is kept at a temperature of 140° C. and its level in the glass flask is controlled such that precisely at this condition nothing can pass over or run out of the siphon. The continuous water separator attached to the reflux condenser is filled with xylene. Then, at 140° C. with stirring, a mixture of reactants is continuously run into the previously introduced novolak solution at a rate of 450 g/hour, the mixture of reactants containing components in proportion to the mixing ratio of 940 g of phenol, 150 g of xylene, 0.98 g of concentrated sulfuric acid and 583 g of aqueous 37% by weight strength formaldehyde solution. The receiver located downstream of the siphon meanwhile fills continuously by the reaction mixture running constantly from the siphon, with the continuously forming novolak solution at a rate corresponding to the introduction of the mixture of reactants into the reactor. The receiver is exchanged every 2 hours, 10 g of colophonium are added in each case to its contents and the contents are worked up by distillation as described in Example 1 but at 190° C. instead of at 210° C., which can be carried out batchwise or may be carried out continuously and the novolak obtained is isolated.

The amounts of novolak solutions taken every 2 hours from the receiver and of the aqueous distillates isolated concurrently in the water separator including their contents of unconverted starting components, in particular the formaldehyde content in the novolak solution (% by weight of $CH_2O$, relative to the novolak solution) and also the formaldehyde content and the phenol content in the aqueous distillate (% by weight of $CH_2O$ and % by weight of phenol, each relative to the aqueous distillate) are summarized in Table 1 and likewise the amount of novolak obtained in each case from the individual novolak solutions after they have been worked up by distillation, including the melting point of the novolak (m.p. in °C.), its viscosity (in mPa.s, measured 1:1 in methoxypropanol at 20° C.) and its content of unconverted phenol starting material (% by weight of phenol, relative to the novolak).

TABLE 1

Continuous preparation of a phenol-formaldehyde novolak

| | Isolation of the novolak solution in receivers No. 1 to 5 taken in each case at two-hour intervals from the continuous reaction at 140° C. | | | Separated-off water taken from the water separator after each two-hour interval | | | Novolak obtained in each case from the novolak solution after working up by distillation | | | |
|---|---|---|---|---|---|---|---|---|---|---|
| Sample in receiver No. | Total reaction time when the receiver is exchanged (hours) | Sample size (g) | $CH_2O$ content (% by wt.) | Amount of water (g) | $CH_2O$ content (% by wt.) | Phenol content (% by wt.) | Amount (g) | Phenol content (% by wt.) | m.p. (°C) | Viscosity measured 1:1 in methoxypropanol at 20° C. |
| 1 | 2 | 630 | 0.05 | 260 | 0.1 | 1.8 | 470 | 2.4 | 81 | 1360 mPa · s |
| 2 | 4 | 650 | 0.1 | 255 | 0.05 | 2.1 | 460 | 2.3 | 79 | 1280 mPa · s |
| 3 | 6 | 640 | 0.12 | 260 | 0.1 | 2.0 | 465 | 1.8 | 80 | 1320 mPa · s |
| 4 | 8 | 620 | 0.05 | 250 | 0.1 | 2.0 | 450 | 2.5 | 77 | 1200 mPa · s |
| 5 | 10 | 650 | 0.05 | 250 | 0.1 | 2.0 | 475 | 2.1 | 79 | 1300 mPa · s |

We claim:

1. A process for the preparation of novolaks from a phenol or a plurality of phenols an oxo compound or a plurality of oxo compounds by condensation of the phenol and oxo-compound reactants in a water-containing medium consisting essentially of condensing the reactants in a medium having a low water content in homogeneous phase at temperatures of $\geq 110°$ C., in the presence of water-immiscible or only partially water-miscible inert organic solvents and of acids as a catalyst, with removal of water by distillation, and preparing or maintaining the medium having a low water content by azeotropically distilling off water from the reaction mixture and recycling of the organic solvent.

2. The process as claimed in claim 1, wherein the oxo compound is a $(C_1-C_{18})$-aldehyde.

3. The process as claimed in claim 1 wherein the catalyst is at least one member of the group consisting of a strong acid and an acid derivative thereof.

4. The process as claimed in claim 1, wherein the acid as catalyst is neutralized at the end of the condensation reaction.

5. The process as claimed in claim 1, wherein sulfuric acid as catalyst or its acid derivatives are eliminated at the end of the condensation reaction by reductive reaction with terpenes.

6. The process as claimed in claim 1, wherein the process is continuous.

7. A reinforced rubber or elastomer containing as reinforcing resin, a novolak produced by the process of claim 1 and optionally a cross-linking agent.

8. A rubber composition containing as a tackifier a novolak produced by the process of claim 1.

* * * * *